United States Patent
Chapman et al.

(10) Patent No.: US 7,205,738 B2
(45) Date of Patent: Apr. 17, 2007

(54) METHOD AND APPARATUS FOR TIME-BASED DC MOTOR COMMUTATION

(75) Inventors: Danny Keith Chapman, Georgetown, KY (US); Thomas Austin Fields, Winchester, KY (US); Steven Michael Turney, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 492 days.

(21) Appl. No.: 10/808,101

(22) Filed: Mar. 24, 2004

(65) Prior Publication Data

US 2005/0212472 A1    Sep. 29, 2005

(51) Int. Cl.
 - H01R 39/46 (2006.01)
 - H02K 13/00 (2006.01)
 - H02P 25/12 (2006.01)

(52) U.S. Cl. .................. 318/439; 318/254; 318/138; 318/461; 318/432; 318/434

(58) Field of Classification Search ............... None
See application file for complete search history.

(56) References Cited

U.S. PATENT DOCUMENTS

| | | | |
|---|---|---|---|
| 3,483,679 A | 12/1969 | Balbierer | |
| 3,924,566 A | 12/1975 | Dennie | |
| 3,927,937 A | 12/1975 | de Keyzer | |
| 4,029,047 A | 6/1977 | Bell | |
| 4,030,824 A | 6/1977 | Smith | |
| 4,251,155 A | 2/1981 | Schnall et al. | |
| 4,281,918 A | 8/1981 | Fortmann | |
| 4,282,471 A | 8/1981 | Budniak et al. | |
| 4,436,413 A | 3/1984 | Oka | |
| 4,459,525 A * | 7/1984 | Hasegawa | 318/561 |
| 4,459,675 A * | 7/1984 | Bateson et al. | 358/1.14 |
| 4,517,503 A * | 5/1985 | Lin et al. | 318/561 |
| 4,530,594 A | 7/1985 | Adachi | |
| 4,591,774 A * | 5/1986 | Ferris et al. | 318/696 |
| 4,593,997 A | 6/1986 | Fox et al. | |
| 4,601,569 A | 7/1986 | Garris | |
| 4,623,827 A | 11/1986 | Ito | |
| 4,627,716 A | 12/1986 | Oka | |
| 4,630,653 A | 12/1986 | Kan | |
| 4,638,225 A | 1/1987 | Morinaga et al. | |
| 4,650,312 A | 3/1987 | Vineski | |
| 4,660,960 A | 4/1987 | Fukunaga et al. | |
| 4,689,540 A | 8/1987 | Tani et al. | |
| 4,711,561 A | 12/1987 | Tsuruoka | |
| 4,819,030 A | 4/1989 | Shibano | |

(Continued)

*Primary Examiner*—Bentsu Ro
*Assistant Examiner*—Erick Glass
(74) *Attorney, Agent, or Firm*—Coats & Bennett, PLLC

(57) ABSTRACT

A motor control circuit uses a stored commutation table to effect time-based commutation of a brushless dc motor. Each entry in the commutation table defines a motor winding commutation state, and an exemplary method of open-loop motor control based on the commutation table comprises commutating the motor based on sequentially selecting table entries at a desired selection rate. That is, motor speed is controlled precisely by controlling the sequential selection rate rather than by relying on feedback from the motor. However, motor feedback for closed-loop control may be used in some modes of operation. For example, the method may include closed-loop control or open-loop control depending on the motor speed range, and may transition from closed-loop to open-loop control.

42 Claims, 6 Drawing Sheets

U.S. PATENT DOCUMENTS

| | | | |
|---|---|---|---|
| 4,819,578 A | 4/1989 | Koiso et al. |
| 4,849,791 A | 7/1989 | Hagihara et al. |
| 4,870,449 A | 9/1989 | Brown |
| 4,885,515 A | 12/1989 | Kurakake et al. |
| 4,891,678 A | 1/1990 | Ishizu et al. |
| 4,941,022 A | 7/1990 | Ohmura et al. |
| 4,958,196 A | 9/1990 | Fujii et al. |
| 4,974,031 A | 11/1990 | Koiso et al. |
| 4,982,231 A | 1/1991 | Matsuuchi |
| 4,985,734 A | 1/1991 | Honda et al. |
| 5,031,001 A | 7/1991 | Kusumoto |
| 5,038,180 A | 8/1991 | Niki |
| 5,089,761 A | 2/1992 | Nakazawa |
| 5,113,227 A | 5/1992 | Miyasaka |
| 5,128,724 A | 7/1992 | Hayashi et al. |
| 5,130,756 A | 7/1992 | Taniyama |
| 5,132,740 A | 7/1992 | Okamoto et al. |
| 5,138,394 A | 8/1992 | Watanabe et al. |
| 5,260,755 A | 11/1993 | Imaizumi |
| 5,309,211 A | 5/1994 | Yoshioka |
| 5,341,199 A | 8/1994 | Thorp et al. |
| 5,355,199 A | 10/1994 | Bray |
| 5,367,234 A | 11/1994 | DiTucci |
| 5,378,975 A | 1/1995 | Schweid et al. |
| 5,383,578 A | 1/1995 | Nishimura |
| 5,440,376 A | 8/1995 | Hagihara |
| 5,444,522 A | 8/1995 | Owens, Jr. |
| 5,486,747 A * | 1/1996 | Welch ........................ 318/811 |
| 5,500,716 A | 3/1996 | Morishita et al. |
| 5,534,988 A | 7/1996 | Gerbasi |
| 5,541,714 A | 7/1996 | Watanabe et al. |
| 5,585,894 A | 12/1996 | Araya et al. |
| 5,594,541 A | 1/1997 | Bonislawski, Jr. et al. |
| 5,625,264 A | 4/1997 | Yoon |
| 5,625,269 A | 4/1997 | Ikeda |
| 5,634,186 A | 5/1997 | Villalobos-Garcia et al. |
| 5,663,624 A * | 9/1997 | Callaway .................... 318/696 |
| 5,708,952 A | 1/1998 | Taniguchi et al. |
| 5,737,483 A | 4/1998 | Inaji et al. |
| 5,821,970 A * | 10/1998 | Sasaki et al. ................ 347/116 |
| 5,875,382 A | 2/1999 | Inoue |
| 5,918,085 A | 6/1999 | Rollins et al. |
| 5,923,931 A | 7/1999 | Kishimoto |
| 5,933,690 A | 8/1999 | Sugimoto et al. |
| 5,936,371 A | 8/1999 | Bolash et al. |
| 5,937,235 A | 8/1999 | Huss et al. |
| 5,952,798 A | 9/1999 | Jones et al. |
| 5,963,006 A | 10/1999 | Otani |
| 5,995,774 A | 11/1999 | Applegate et al. |
| 6,014,541 A | 1/2000 | Kato et al. |
| 6,107,763 A | 8/2000 | Rossi |
| 6,154,619 A | 11/2000 | Boockholdt et al. |
| 6,266,511 B1 | 7/2001 | Murakami et al. |
| 6,298,217 B1 | 10/2001 | Murayama et al. |
| 6,308,036 B1 | 10/2001 | Taniyama et al. |
| 6,438,321 B1 | 8/2002 | Lin |
| 6,505,127 B1 | 1/2003 | Togami |
| 6,901,212 B2 | 5/2005 | Masino |

* cited by examiner

| STATE | DIR | POSITION STATE | | | COMMUTATION STATE SIGNALS | | | | | |
|---|---|---|---|---|---|---|---|---|---|---|
| | | $\varnothing_1$ | $\varnothing_2$ | $\varnothing_3$ | H $\varnothing_1$ | L | H $\varnothing_2$ | L | H $\varnothing_3$ | L |
| 1 | CCW | LO | HI | LO | ON | OFF | OFF | PWM | OFF | OFF |
| 2 | CCW | LO | HI | HI | ON | OFF | OFF | OFF | OFF | PWM |
| 3 | CCW | LO | LO | HI | OFF | OFF | ON | OFF | OFF | PWM |
| 4 | CCW | HI | LO | HI | OFF | PWM | ON | OFF | OFF | OFF |
| 5 | CCW | HI | LO | LO | OFF | PWM | OFF | OFF | ON | OFF |
| 6 | CCW | HI | HI | LO | OFF | OFF | OFF | PWM | ON | OFF |
| 1 | CW | LO | LO | HI | OFF | OFF | OFF | PWM | ON | OFF |
| 2 | CW | LO | HI | HI | OFF | PWM | OFF | OFF | ON | OFF |
| 3 | CW | LO | HI | LO | OFF | PWM | ON | OFF | OFF | OFF |
| 4 | CW | HI | HI | LO | OFF | OFF | ON | OFF | OFF | PWM |
| 5 | CW | HI | LO | LO | ON | OFF | OFF | OFF | OFF | PWM |
| 6 | CW | HI | LO | HI | ON | OFF | OFF | PWM | OFF | OFF |

STORED COMMUTATION TABLE (3Ø EMBODIMENT)

*FIG. 3*

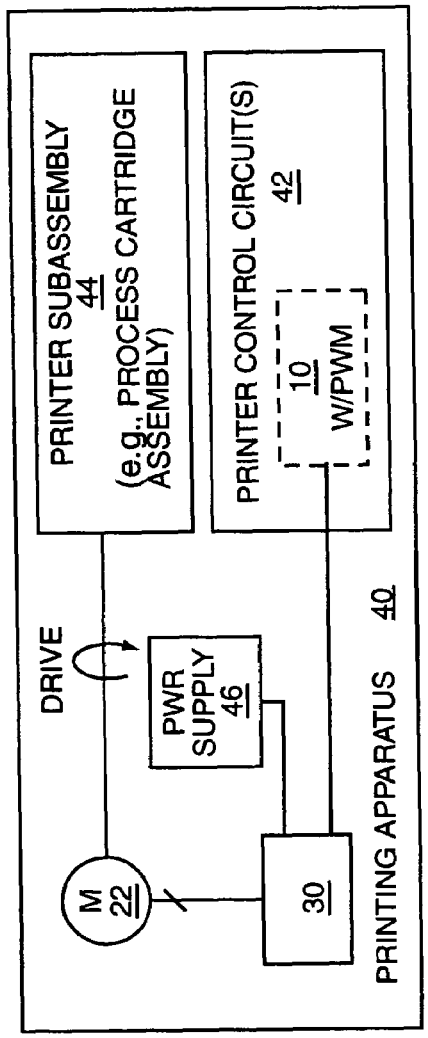
*FIG. 6*
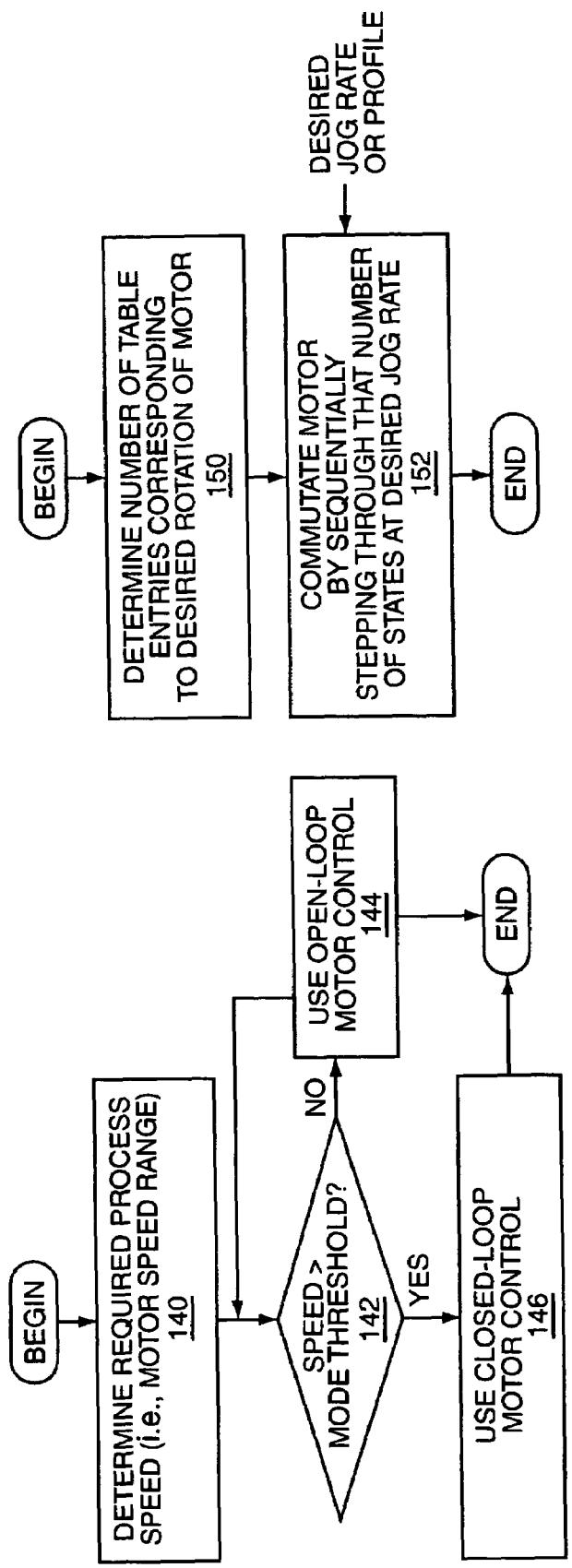
*FIG. 8*
*FIG. 7*

METHOD AND APPARATUS FOR TIME-BASED DC MOTOR COMMUTATION

BACKGROUND

The present invention generally relates to motor control and particularly relates to speed and positioning control of brushless servomotors.

Brushless servomotors use electronic commutation of phase currents rather than electromechanical (brushes) commutation. Such motors generally have a permanent magnet rotor and a wound stator, and commutation is a function of rotor position.

Commutation refers to actively steering currents or voltages to the proper motor phases at the proper times, and is done electromechanically in brush motors via brushes and a commutator. In brushless motors, however, switching electronics perform motor commutation using rotor position information as indicated by a motor feedback signal. Such feedback signals usually are generated by Hall effect sensors responsive to the motor magnets, or by sensing motor-induced voltages, or by sensing encoder pulses, etc.

A number of disadvantages arise in such contexts. For example, the speed control resolution of Hall sensor feedback typically is poor. Generally, the angular resolution and accuracy for Hall sensor feedback is no better than the pole/magnet count of the motor and the positioning accuracy of the Hall sensors. Further, speed control based on sensing induced voltages, while offering potential cost advantages over Hall sensor based control, typically works only at higher motor speeds where the induced signals are robust enough for reliable control feedback.

Such disadvantages represent particularly significant challenges in certain motor applications. For example, brushless dc motors provide an economical and reliable means for driving the various printing subassemblies used in a variety of print systems, such as laser printers, photocopiers, etc. However, relatively precise motor rotation control is required in such systems to maintain acceptable printing quality over a potentially wide range of printing process speeds.

SUMMARY

The present invention comprises a method and apparatus for time-based commutation of brushless motors. In an exemplary embodiment, the phase windings of a brushless dc motor are commutated according to commutation state table entries in a stored commutation table. With this time-based commutation method, the motor windings are energized in a commutating sequence defined by the table entries, and the motor speed is a function of the selection rate used to sequentially step through the commutation table. Time-based commutation thus provides essentially arbitrary motor speed control range and resolution, and provides precise rotational movement control without need for expensive or complex motor feedback arrangements.

One or more embodiments of the present invention apply that advantageous speed and rotational control to image forming apparatus operations. An exemplary method of motor control in an image forming apparatus comprises driving an image forming subassembly of the image forming apparatus with a brushless dc motor, and controlling the motor based on open-loop commutation comprising commutating the motor by energizing its windings according to a stored commutation table whose table entries define sequential commutation states for the windings, and controlling motor speed by setting a selection rate for sequentially selecting the table entries.

Thus, an exemplary image forming apparatus comprises an image forming subassembly used in an image forming process of the apparatus, a brushless dc motor configured to drive the subassembly, and a motor control circuit configured to commutate the motor under open-loop control based on energizing its windings according to a stored commutation table whose table entries define sequential commutation states for the windings. The exemplary motor control circuit is configured to control motor speed by setting a selection rate, fixed or variable, for sequentially selecting table entries, and may be implemented in hardware, software, or some combination thereof.

As such, the motor control circuit may be implemented in whole or in part with other control/processing circuits within the image forming apparatus, and can operate according to image forming process requirements. Complementing this application, the motor control circuit may be configured to provide both open-loop control of the motor based on the commutation table and closed-loop control of the motor based on a motor feedback signal. For example, it may use closed-loop control for a first range of printing process speeds, and may use open-loop control for a second range of process speeds. Further, the motor control circuit may implement a jog mode of open-loop motor control for precisely jogging the motor a desired rotational amount at certain times during operation of the image forming apparatus, such as to relieve windup or binding in the drive apparatus of the subassembly.

More broadly, the present invention essentially can be applied to any motor control application. In this context, the present invention comprises a method of controlling a brushless dc motor comprising commutating the motor under open-loop control based on energizing its windings according to a stored commutation table whose table entries define sequential commutation states for the windings, and controlling motor speed by setting a selection rate for sequentially selecting table entries. Motor speed may be defined according to a desired velocity profile embodied in a table or by a speed control algorithm, such as a defined speed control function. As such, the method may employ a varying table entry selection rate to ramp motor speed up or down as desired.

An exemplary motor control circuit for controlling a brushless dc motor according to the present invention thus comprises a logic circuit configured to obtain sequential commutation states for the motor from a stored commutation table whose table entries define sequential commutation states for the windings of the motor, and an output circuit configured to output commutation signals for commutating motor according to the sequential commutation states. The exemplary logic circuit, which may be embodied in software, hardware, or some combination thereof, is configured to control motor speed by setting a selection rate for sequentially selecting table entries. The circuit may include or be associated with memory for storing the commutation table, or may receive the commutation table as input data from another processing circuit.

Details for the above exemplary aspects and features of the present invention appear in the following discussion and in the accompanying drawings. Of course, the present invention is not limited to such details and those skilled in the art will recognize additional features and advantages based on the information provided herein.

BRIEF DESCRIPTION OF THE DRAWINGS

FIG. 3 is a diagram of an exemplary stored commutation table that may be used to carry out time-based commutation of the three-phase motor illustrated in FIG. 2.

FIG. 6 is a diagram of an exemplary image forming apparatus, including a printing subassembly driven by a motor control circuit configured according to the present invention.

FIG. 7 is a diagram of exemplary processing logic for motor start control.

FIG. 8 is a diagram of exemplary processing logic for transitioning between closed-loop and open-loop motor control as a function of motor speed.

DETAILED DESCRIPTION

At the outset of this description, it should be understood that the open-loop motor control method detailed herein is explained at various points in the context of an image forming apparatus. While the precise positional control and wide ranging speed control provided by the present invention may be particularly beneficial in such contexts, it should be understood by those skilled in the motor arts that the present invention is in no way limited to such applications. Indeed, the present invention will find application essentially anywhere accurate, low-cost brushless motor control is desired.

Figure 1:
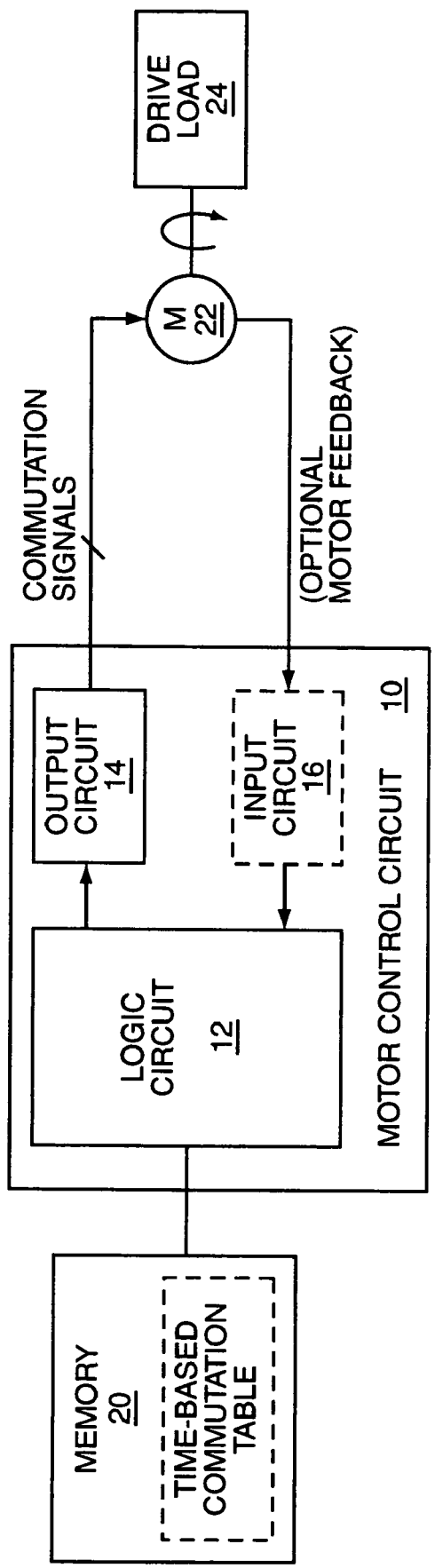
FIG. 1 is a diagram of an exemplary motor control circuit according to one or more embodiments of the present invention.

With this broad applicability in mind, FIG. 1 illustrates an exemplary motor control circuit 10 that comprises a logic circuit 12, an output circuit 14, and, optionally, an input circuit 16. Motor control circuit 10 further includes or is associated with a memory 20, which may be essentially any type of memory device, and which includes stored data embodying a time-based commutation table. The output circuit 14 may include the actual commutating circuits (e.g., transistor switches) used to commutate the motor windings, or may comprise, for example, logic level signals provided as inputs to such driving circuits.

In operation, motor control circuit 10 uses the commutation state information contained in the commutation table entries to generate commutation signals for motor 22, e.g., a brushless dc motor, that is configured to drive a load 24. As will be explained later herein, motor control circuit 10 may receive some form of feedback from motor 22 via its optional input circuit 16. However, in an exemplary open-loop control mode of operation, motor control circuit 10 performs time-based commutation of motor 22 based on sequentially selecting table entries from the time-based commutation table and generating corresponding motor winding commutation signals. In that mode, motor control circuit 10 controls motor speed based on the rate at which those entries are selected, which establishes the commutation dwell time for the motor windings, rather than based on receiving motor position feedback.

As is explained elsewhere herein, the motor control circuit 10 may be configured for different operating modes, such as a first mode wherein it controls the motor based on open-loop (time-based) commutation as just described, and a second mode wherein it controls the motor based on closed-loop commutation responsive to one or motor feedback signals. Moreover, motor control circuit 10 may be configured for transitional operation wherein it changes from one mode to the other, such as part of motor startup control, or as part of operating the motor over different speed ranges.

Figure 2:
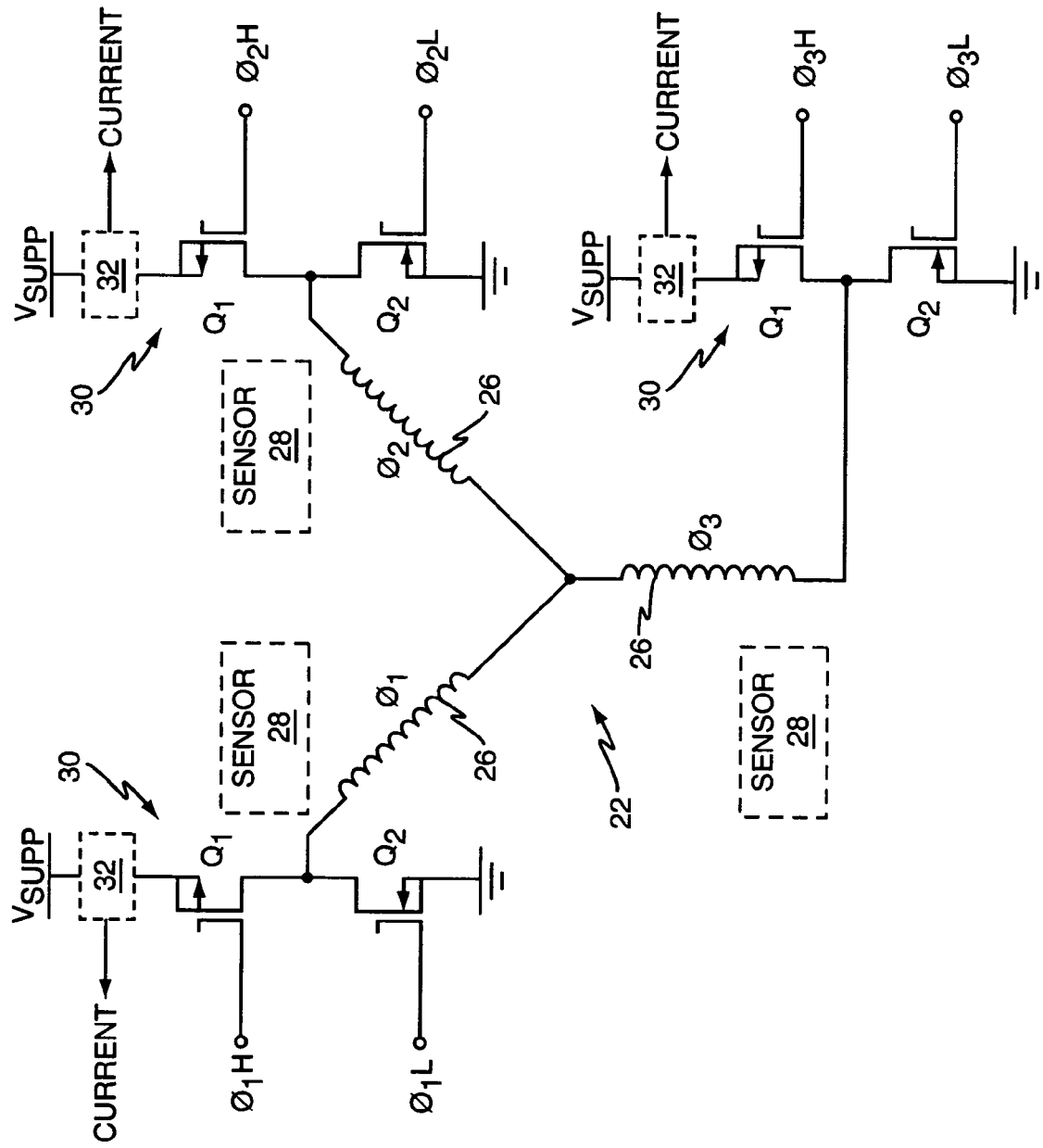
FIG. 2 is a diagram of an exemplary three-phase motor and its associated drive and sensing electronics.

For now, however, it may be helpful to provide a better understanding open-loop control using time-based commutation. To that end, FIG. 2 illustrates an exemplary three phase embodiment of motor 22. (Those skilled in the art will appreciate that the present application may be applied to motor control involving a lesser or greater number of winding phases.) In any case, motor 22 is depicted in an exemplary "Wye" configuration wherein its motor windings 26 are arranged as phase 1 ($\varnothing_1$), phase 2 ($\varnothing_2$), and phase 3 ($\varnothing_3$). Motor 22 further includes a number of sensors 28, which may be Hall effect sensors that are positioned within the motor assembly to sense the proximity of the motor's permanent magnets as a means of detecting rotor position. Note that sensors 28 may comprise additional or alternative sensors, such as copper traces on a printed circuit board within the motor assembly that provide an induced voltage signal feedback to motor control circuit 10 responsive to the time-varying magnetic fields arising from motor rotation, e.g., voltage signals generated by the motor's permanent magnets passing over the copper traces during motor rotation.

Each winding phase is associated with a driver circuit 30 comprising push-pull transistors $Q_1$ and $Q_2$, and each driver circuit 30 may include a circuit 32 for detecting winding current and/or voltage and, optionally, limiting winding current. These driver circuits 30 may be associated with or included in motor control circuit 10, for example as part of its output circuit 14. Regardless, motor control circuit 10 generates the commutating signals for driving circuits 30 such that the $Q_1$ and $Q_2$ transistors in each drive circuit 30 are turned on and off as needed to achieve the desired commutating sequence. Also note that as explained later herein, motor control circuit 10 may generate the commutating signals using Pulse Width Modulation (PWM) to achieve an average voltage winding that is lower than the bulk supply voltage, $V_{SUPP}$. In support of PWM operation, it should be understood that motor control circuit 10 includes or is associated with the appropriate timer/counters for PWM signal generation. Such PWM signal generation circuitry may be hardware and/or software based, and in an exemplary embodiment, motor control circuit 10 comprises, or is associated with, a microprocessor, ASIC, FPGA, or other processing circuit.

FIG. 3 illustrates an exemplary stored commutation table for the three-phase embodiment of motor 22 as depicted in FIG. 2, which shows the optional use of PWM-based commutation signals. As illustrated, the commutation table entries (rows) define the commutation state signals to be used for energizing the motor windings. The rows are divided into two subsets of sequential states: one set for counter clockwise motor rotation, and the other for clockwise motor rotation. Further, it may be noted that the table entries in each subset are each associated with a motor position state that may be obtained from Hall sensor or other motor position feedback. While this position state information generally is not used to control time-based commutation, it may be used to identify the appropriate starting entry to begin time-based commutation.

For example, motor control circuit 10 may evaluate sensor feedback signals from sensors 28 and determine that the phase 1 sensor 28 is high, the phase 2 sensor 28 is low, and the phase 3 sensor 28 is high. According to the illustrated table, that sensor state feedback corresponds to table entry 4 for a counter clockwise (CCW) motor direction and to table entry 1 for a clockwise (CW) motor direction.

Thus, if it is desired to begin time-based commutation of motor 22 in the counter clockwise direction, motor control circuit 10 would begin motor commutation using the commutation state information for table entry 4 in the subsection of the commutation table defined for counter clockwise rotation. That is, motor control circuit 10 would configure its output commutation signals such that $Q_1$ for phase 1 is turned off, $Q_2$ for phase 1 is turned on according to a desired PWM value, $Q_1$ for phase 2 is turned on (i.e., hard on to the bulk supply, $V_{SUPP}$), and the remaining $Q_1$s and $Q_2$s for phase 2 and phase 3 are turned off. With that on/off transistor state, current flows through the motor 22 from the bulk supply into the phase 2 winding, and out through the phase 1 winding.

Because the current flowing out through the phase 1 winding is sunk by $Q_2$ of the corresponding drive circuit 30, the PWM value applied to $Q_2$'s gate determines the average voltage across the motor's windings. As is detailed later herein, the average motor winding voltage optionally may be controlled to reduce motor power while still ensuring sufficient torque margin to avoid motor slippage while operating in the time-based commutation mode. Of course, the PWM drive could be applied to the high-side transistors (the $Q_1$ transistors) rather than the low-side transistors (the $Q_2$ transistors) if desired, or PWM drive could be omitted altogether for application of the full bulk supply voltage across the windings, possibly with current limiting (e.g., via circuits 32).

In any case, continuing with the time-based commutating sequence, motor control circuit 10 sequentially selects the subsequent table entries, i.e., entry 5 and entry 6, and continues the sequence by rolling back around to entry 1, 2, and so on at a sequence selection rate that is set for the desired motor speed. Thus, the sequencing logic of the motor control circuit 10 may be configured, for example, as a simple modulo-N counter, where N equals the total number of table entries in the commutation sequence.

The selection rate may be varied in very precise time increments by the motor control circuit 10 using, for example, a hardware or software based timer/counter for essentially arbitrary speed control resolution. Further, motor control circuit 10 may be configured to use a variable table entry selection rate corresponding to a desired motor velocity profile.

Figure 5:
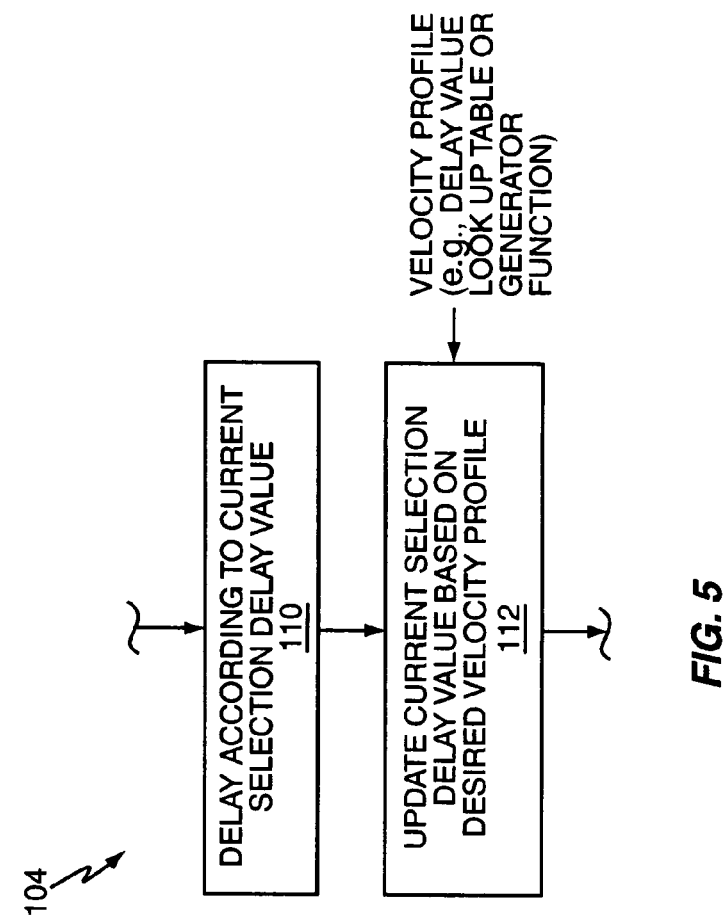
FIG. 5 is a diagram of exemplary processing logic for motor speed control according to a desired velocity profile in the context of time-based commutation.
Figure 4:
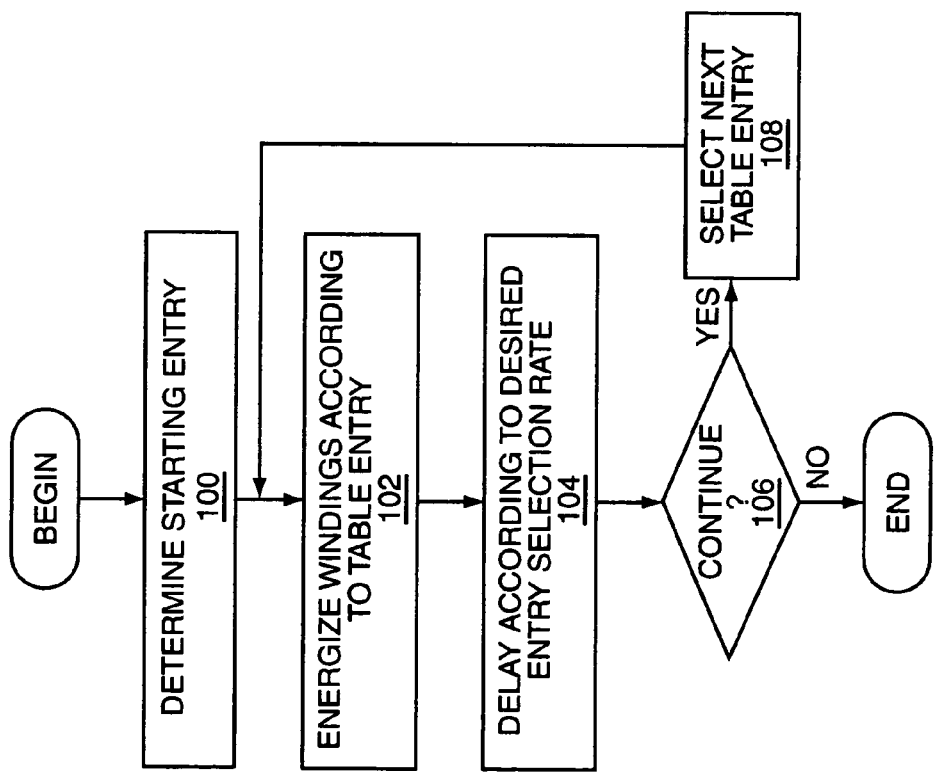
FIG. 4 is a diagram of exemplary processing logic for time-based motor commutation according to one or more embodiments of the present invention.

FIGS. 4 and 5 present exemplary processing logic complementing the above time-based commutation operations. For example, FIG. 4 broadly illustrates processing logic for beginning and carrying on time-based commutation. Processing begins with determining the appropriate starting table entry (Step 100). As described above, the starting table entry may be selected by identifying the table entry corresponding to the motor's rotor position, which may be indicated by positional feedback signals from the motor 22. Note that the starting entry is selected from the table subset corresponding to the desired direction of motor rotation (Step 100). Processing continues with the motor control circuit 10 generating the commutation signals to energize the motor windings in accordance with the selected table entry (Step 102). With the motor's windings thus energized, progression to the next commutation state is then delayed according to a desired entry selection rate (Step 104). As indicated before, the rate at which table entries are sequentially selected determines the rate at which the corresponding commutation signal states are sequenced, which thereby controls the motor speed.

If continued operation in time-based commutation mode is desired (Step 106), processing continues with motor control circuit 10 selecting the next table entry (Step 108) and repeating the prior processing steps according to that entry's commutation state information. Successive table entries are selected in this fashion for as long as time-based commutation operation is desired, and during such continued operation the selection sequence wraps-around from the last to the first entry.

FIG. 5 illustrates exemplary motor speed control processing in the context of FIG. 4, wherein for Step 104 the motor control circuit 10 imposes a delay according to a current selection delay value (Step 110), wherein it holds the current commutation state of motor 22 before advancing to the next table entry. As part of this processing, motor control circuit 10 may maintain the same delay to be used for the next commutation state, i.e., it may use a fixed selection delay for each sequence step, or it may update the current selection delay value based on a desired velocity profile (Step 112). That is, motor control circuit 10 may store or otherwise have access to one or more velocity profile tables or speed control functions that it uses to generate a variable selection delay such that the motor speed can be ramped up or down as needed or desired.

Such speed control may be particularly beneficial in certain motor control contexts. For example, FIG. 6 illustrates an image forming apparatus 40 comprising a printer control circuit 42, an image forming subassembly 44, and a power supply 46. Image forming apparatus 40 further comprises an exemplary embodiment of the aforementioned motor control circuit 10, associated drive circuits 30, and brushless motor 22. Here, motor control circuit 10 may be advantageously configured for PWM-based control of motor 22 as mentioned earlier herein. To that end, motor control circuit 10 may be implemented as part of one or more other processing circuits comprising printer control circuit 42, e.g., as part of a printer microprocessor or programmable logic-based control circuit that includes timers, counters, or other elements for generating precisely timed control signals.

In any case, the essentially arbitrary speed control range and the precise rotational movement control for motor 22 that is afforded by time-based commutation may be put to particularly advantageous use within image forming apparatus 40, and particularly where the driven printer subassembly 44 comprises part of the image forming system within image forming apparatus 40. For example, printer subassembly 44 may comprise a process cartridge that includes a developer roller and a photoconductive drum or other image-forming member, wherein the motor 22 is used to drive a gear set or other drive train arrangement for rotating those members.

In an exemplary embodiment in the context of image forming apparatus 40, the motor control circuit 10 is configured to selectively operate in an open-loop control mode wherein it uses time-based commutation to control motor 22, or in a closed-loop control mode wherein it uses motor feedback (e.g., EMF or Hall sensor feedback) to control motor 22. For example, motor-induced voltage feedback signals may be sufficiently robust for accurate closed-loop control above a certain motor speed range, while time-based commutation may be preferred for lower ranges of motor speeds where those signals are less robust or even nonexistent.

FIG. 7 illustrates exemplary processing logic for carrying out selected open and closed-loop control operation. Processing begins with a determination of the required process speed (i.e. a determination of the required motor speed range) (Step 140). If the motor speed is below a threshold at which the positional feedback is considered robust enough for reliable speed control, motor control circuit 10 uses open-loop motor control (Step 144). However, if the motor speed is above the threshold, motor control circuit 10 uses closed-loop motor control based on the positional feedback (Step 146).

Motor control circuit 10 also may be configured to implement a "jog" mode of motor control that may be particularly advantageous in the operation of image forming apparatus 40. FIG. 8 illustrates exemplary processing logic to implement jog control of motor 22, wherein motor control circuit 10 jogs motor 22 by a typically small and precise rotational amount at one or more desired times during operation of image forming apparatus 40. In particular, motor control circuit 10 is configured to jog motor 22 based on determining the number of table entries corresponding to the desired amount of motor rotation (Step 150). Motor control circuit 20 may be programmed with or may be provided with information indicating the number of mechanical degrees of rotation that are associated with each stepwise progression through the commutation table. Thus, motor control circuit 10 is configured to determine the number of table entries it must step through to achieve the desired angular rotation of motor 22.

With determination of the correct number of table entries to be sequenced through, motor control logic 10 sequentially steps through that number of commutation states at a desired jog rate (Step 152). As before, the jog rate can be a fixed selection rate or can be a variable selection rate determined according to a desired jog rate profile.

Figure 9:
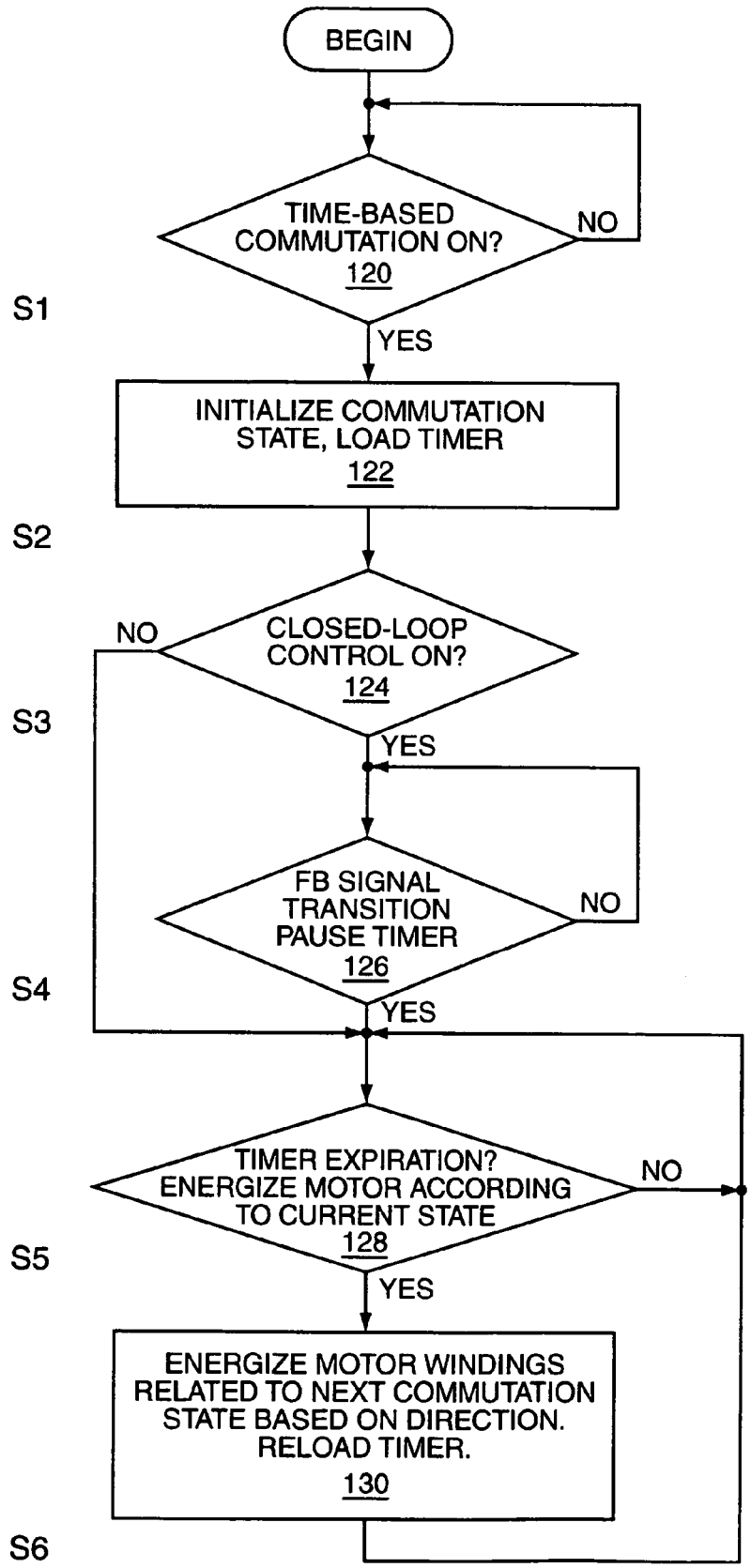
FIG. 9 is a diagram of exemplary processing logic for jog mode motor control based on time-based commutation.

FIG. 9 illustrates additional exemplary processing logic that can be implemented in motor control circuit 10 for exemplary starting control of motor 22. Motor control circuit 10 can be configured to start motor 22 by initially using a relatively long delay for the table entry selection rate and then successively shortening that delay as the motor speed increases until a delay equal to the desired selection rate is achieved, which corresponds to the desired motor speed. That ramping function may be implemented as a second-order ramping control function to minimize motor power expended during acceleration of motor 22.

Further, motor control circuit 10 can be configured to use positional feedback for motor 22 to determine the correct starting entry in its time-based commutation table as described before, thereby eliminating control steps that otherwise would be required to electrically/mechanically "home" motor 22. Further, it should be noted that motor control circuit 10 may be configured to adjust the PWM values of its commutation signals during ramping to further reduce power expended in motor 22. Note that as indicated earlier herein, motor control circuit 10 may set the PWM values such that an adequate torque margin is maintained for the motor at all times to prevent motor slippage, which would break the electrical/mechanical alignment that is assumed during time-based commutation.

Motor control circuit 10 also can be configured to implement another exemplary method for ramping motor 22, wherein it uses closed-loop commutation during initial ramping and then transitions into open-loop commutation, i.e., time-based commutation. Complementing this exemplary approach, the motor control circuit 10 may be configured to monitor the PWM values needed during closed-loop motor control to drive motor 22 for the specific load being driven. That is, the PWM values are driven under closed-loop control to the value needed to maintain the desired motor speed for the actual motor load being driven.

Those PWM values then serve as a "reference" for the motor control circuit's PWM settings to be used during open-loop commutation. For example, since motor slippage during time-based commutation potentially would lead to undetected loss of commutating synchronization, motor control circuit 10 may apply a desired torque margin multiplier to the PWM values observed for closed-loop control and then use the increased PWM values for open-loop commutation of motor 22. By way of non-limiting example, suitable torque margin values range from about 1.2 to about 1.7, corresponding to torque margins ranging from 20 percent to 70 percent. Regardless of the particular torque margin used, motor control circuit 10 in general can use closed-loop control to determine the nominal motor winding voltages needed for closed-loop speed control. It can then use somewhat higher average winding voltages (i.e., higher PWM control values) during open-loop time-based commutation to ensure that motor slippage does not occur as a result of load variations during open-loop commutation of motor 22.

Turning to the specifics of FIG. 9, that processing logic illustrates a state machine that may be implemented within motor control circuit 10. The illustrated logic provides for initial ramp up under closed loop control, followed by a controlled transition to open-loop control.

Motor control circuit 10 operates in an "idle" state (S1) whenever time-based commutation is disabled (Step 120). Once time-based commutation is enabled, motor control circuit 10 transitions to state S2 (Step 122), wherein it initializes its commutation logic, i.e., its commutation table selection and drive signal logic according to the positional feedback from motor 22, and initializes a commutating timer with a value corresponding to the desired selection rate to be used for the commutation table.

Motor control circuit 10 then determines whether it should transition to state S3 where closed-loop control is enabled (Step 124), or whether it should transition to state S5 (Step 128) wherein it energizes the motor windings according to the currently selected table entry and waits for expiration of the commutation timer. If closed-loop control is on (Step 124), motor control circuit 10 transitions from state S3 to state S4 wherein it waits for a transition from the appropriate positional feedback sensor (Step 126).

When that signal transition is detected, motor control circuit 10 transitions from state S4 to state S5 wherein it energizes the motor control windings according to the current commutation state and again waits for the expiration of the commutation timer. Once the timer expires, motor control circuit 10 transitions from state S5 to state S6 wherein it energizes the motor windings according to the next commutation state as indicated by the next table entry, and resets the commutation timer (Step 130), and transitions back to state S5 where it again waits for timer expiration.

As is evident by the above exemplary details, the motor control circuit 10 offers precise and wide ranging motor speed control using time-based commutation, wherein the commutation state signals for exciting the windings of motor 22 are obtained by sequentially selecting entries from a stored commutation table at a rate corresponding to the desired motor speed. Further, this method of open-loop motor control, permits motor control circuit 10 to effect very precise jog movements of motor 22, wherein it jogs the motor a controlled angular distance by stepping through a number of entries in the commutation table corresponding to the desired amount of angular rotation. Further, motor control circuit 10 can be configured to implement both closed-loop motor control based on positional motor feedback, at times when open-loop control is not desired or as a means of more reliably transitioning into such open-loop control operation.

These and other features are particularly advantageous in applications where accurate and wide ranging speed control is desirable, and where precise motor jog movements may be used to, for example, relieve drive gear bindings in a process cartridge subassembly. However, those skilled in the art will appreciate that the present invention is not limited to such applications. Indeed the present invention is not limited by any of the foregoing details, but rather is limited only by the following claims and their reasonable equivalence.

What is claimed is:

1. A method of controlling a brushless dc motor comprising:
   commutating the motor under open-loop control based on energizing its windings according to a stored commutation table whose table entries define sequential commutation states for the windings; and
   controlling motor speed by setting a selection rate for sequentially selecting the table entries;
   wherein the motor comprises an image forming apparatus drive motor, and wherein controlling motor speed by setting a selection rate for sequentially selecting table entries comprises setting the motor speed according to a desired printing process speed.

2. The method of claim 1, further comprising selecting one of the table entries as a commutation starting point based on positional feedback from the motor.

3. The method of claim 2, wherein the positional feedback comprises an indication of rotor angle for the motor, and wherein selecting one of the table entries as a commutation starting point based on positional feedback from the motor comprises selecting the table entry corresponding to a commutation state matching the indicated rotor angle.

4. The method of claim 1, further comprising transitioning from a closed-loop control method based on motor feedback to the open-loop control method based on the stored commutation table as a function of the motor speed.

5. The method of claim 4, wherein transitioning from a closed-loop control method based on motor feedback to the open-loop control method based on the stored commutation table as a function of motor speed comprises using the closed-loop control method for a first motor speed range and using the open-loop control method for a second motor speed range.

6. The method of claim 1, further comprising controlling a torque margin of the motor to avoid motor slippage during open-loop control of the motor.

7. The method of claim 6, wherein controlling a torque margin of the motor to avoid motor slippage during open-loop control of the motor comprises controlling an average winding voltage of the motor to maintain motor torque at a level above expected or measured motor drive loads.

8. The method of claim 1, further comprising, in a jog mode of motor operation, determining a number of commutation states equal to a desired rotational jog of the motor, and commutating the motor under open-loop control based on selecting that number of table entries from the stored commutation table, and wherein the selection rate is set based on a desired jog speed profile.

9. The method of claim 8, wherein, in the jog mode of motor operation, the method further comprises determining a starting entry in the table based on positional feedback from the motor.

10. The method of claim 1, further comprising effecting a desired motor velocity profile based on varying the selection rate according to the desired motor velocity profile.

11. The method of claim 1, further comprising controlling average winding voltages of the motor while commutating the motor under open-loop control to maintain a torque margin for the motor relative to expected or measured image forming apparatus drive loads to avoid motor slippage.

12. The method of claim 1, further comprising setting an average winding voltage for the motor responsive to closed-loop control of the motor, increasing that average winding voltage by an amount corresponding to a desired torque margin for commutating the motor under open-loop control, and transitioning from the closed-loop control to the open-loop control.

13. The method of claim 1, wherein the stored commutation table comprise a first set of entries corresponding to a first motor direction and a second set of entries corresponding to a second motor direction, and further comprising sequentially selecting table entries from the first set or the second set depending on a desired motor direction.

14. A method of motor control in an image forming apparatus comprising:
   driving an image forming subassembly of the image forming apparatus with a brushless dc motor; and
   controlling the motor based on open-loop commutation comprising commutating the motor by energizing its windings according to a stored commutation table whose table entries define sequential commutation states for the windings, and controlling motor speed by setting a selection rate for sequentially selecting the table entries;
   further comprising starting the motor in the first mode and transitioning to the second mode and selectively operating in either the first mode or the second mode as a function of a desired process speed for the image forming apparatus.

15. The method of claim 14, wherein controlling the motor based on open-loop commutation comprises determining a starting table entry in the stored commutation table based on a motor feedback signal that indicates motor position.

16. The method of claim 14, further comprising controlling the motor based on closed-loop commutation in a first mode, and controlling the motor based on the open-loop commutation in a second mode, wherein controlling the motor based on closed-loop commutation comprises commutating the motor under closed-loop control responsive to one or more motor feedback signals.

17. The method of claim 14, further comprising determining an average motor winding voltage used for driving the motor in the first mode, and calculating a higher average motor winding voltage to be used for the second mode based on a torque margin desired for open-loop commutation of the motor.

18. The method of claim 14, wherein selectively operating in either the first mode or the second mode as a function of a desired process speed for the image forming apparatus 19. A motor control circuit for controlling a brushless dc motor comprising:
- a logic circuit configured to obtain sequential commutation states for the motor from a stored commutation table whose table entries define sequential commutation states for the windings of the motor; and
- an output circuit configured to output commutation signals for commutating motor according to the sequential commutation states;
- said logic circuit further configured to control motor speed by setting a selection rate for sequentially selecting table entries;
- wherein the motor comprises an image forming apparatus drive motor, and wherein the motor control circuit is configured to control the motor speed as a function of printing process operations.

20. The motor control circuit of claim 19, wherein the logic circuit is configured to select one of the table entries as a commutation starting point based on positional feedback from the motor.

21. The motor control circuit of claim 20, further comprising an input circuit configured to receive a feedback signal providing the positional feedback from the motor.

22. The motor control circuit of claim 20, wherein the positional feedback comprises a indication of rotor angle for the motor, and wherein the logic circuit is configured to select the table entry corresponding to a commutation state matching the indicated rotor angle.

23. The motor control circuit of claim 19, wherein the motor control circuit is configured to control the motor under closed-loop control based on motor feedback in a first mode of operation, and configured to control the motor under open-loop control based on the stored commutation table in a second mode of operation.

24. The motor control circuit of claim 19, wherein the motor control circuit is configured to operate in the first mode for a first range of motor speeds, and is configured to operate in the second mode for a second range of motor speeds.

25. The motor control circuit of claim 19, wherein the motor control circuit is configured to control a torque margin of the motor to avoid motor slippage during open-loop control of the motor.

26. The motor control circuit of claim 25, wherein the motor control circuit is configured to control the torque margin of the motor by controlling an average winding voltage of the motor to maintain motor torque at a level above expected or measured motor drive loads.

27. The motor control circuit of claim 19, wherein the motor control circuit is configured to operate in a jog mode of motor operation wherein it determines a number of commutation states equal to a desired rotational jog of the motor, and commutates the motor under open-loop control based on selecting that number of table entries from the stored commutation table, and wherein the motor control circuit controls the selection rate based on a desired jog rate profile.

28. The motor control circuit of claim 27, wherein, for jog mode operation, the motor control circuit is configured to determine a starting entry in the table based on positional feedback from the motor.

29. The motor control circuit of claim 19, wherein the motor control circuit is configured to effect a desired motor velocity profile based on varying the selection rate according to the desired motor velocity profile.

30. The motor control circuit of claim 19, wherein the motor comprises an image forming apparatus drive motor, and wherein the motor control circuit is configured to set the selection rate as a function of printing process requirements of the image forming apparatus.

31. The motor control circuit of claim 19, wherein the motor control circuit is configured to control average winding voltages of the motor while commutating the motor based on the stored commutation table to maintain a torque margin for the motor relative to expected or measured motor drive loads to avoid motor slippage.

32. The motor control circuit of claim 31, wherein the motor control circuit is configured to determine a desired average winding voltage for the motor based on a measured drive load and a desired torque margin.

33. The motor control circuit of claim 31, wherein the motor control circuit is configured to set the average winding voltages based on a desired torque margin relative to estimated motor drive loads.

34. The motor control circuit of claim 19, wherein the stored commutation table comprise a first set of entries corresponding to a first motor direction and a second set of entries corresponding to a second motor direction, and wherein the motor control circuit is configured to control motor direction by sequentially selecting table entries from the first set or the second set depending on a desired motor direction.

35. The motor control circuit of claim 19, wherein the motor control circuit comprises a processor circuit configured to execute stored program instructions.

36. The motor control circuit of claim 19, wherein the motor control circuit comprises at least a portion of an Application Specific Integrated Circuit.

37. The motor control circuit of claim 19, wherein the motor control circuit comprises at least a portion of a Field Programmable Gate Array.

38. An image forming apparatus comprising:
- a printer subassembly used in an image forming process of the image forming apparatus;
- a brushless do motor configured to drive the printer subassembly; and
- a motor control circuit configured to commutate the motor under open-loop control based on energizing its windings according to a stored commutation table whose table entries define sequential commutation states for the windings;
- said motor control circuit configured to control motor speed by setting a selection rate for sequentially selecting table entries;
- wherein the motor control circuit is associated with a memory that is configured to store the commutation table.

39. The image forming apparatus of claim 38, wherein, in a jog mode of operation, the motor control circuit is configured to determine a number of commutation states equal to a desired rotational jog of the motor, and commutate the motor under open-loop control based on selecting that number of table entries from the stored commutation table.

40. The image forming apparatus of claim 39, wherein the motor control circuit is configured to jog the motor a desired rotational amount in a reverse direction relative to image forming process direction of the motor to relieve binding in the printer subassembly.

41. The image forming apparatus of claim 38, wherein the motor control circuit is configured to commutate the motor under open-loop control based on the stored commutation table in a first mode of operation, and is configured to commutate the motor under closed-loop control based on a motor feedback signal in a second mode of operation, and wherein the motor control circuit is configured to transition between the first and second modes of operation as a function of motor speed.

42. The image forming apparatus of claim 41, wherein the motor control circuit is configured to operate in the first mode if a desired motor speed is below a defined threshold, and is configured to operate in the second mode if the desired motor speed is above a defined threshold.

* * * * *